(12) United States Patent
Kikuchi et al.

(10) Patent No.: US 6,720,753 B2
(45) Date of Patent: Apr. 13, 2004

(54) POWER GENERATION SYSTEM USING SYNCHRONOUS GENERATOR

(75) Inventors: Akira Kikuchi, Hitachi (JP); Motoo Futami, Hitachiota (JP); Yasuyuki Sugiura, Takahagi (JP); Naoshi Sugawara, Hitachi (JP); Kouichi Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 3 days.

(21) Appl. No.: 10/191,282

(22) Filed: Jul. 10, 2002

(65) Prior Publication Data

US 2003/0080701 A1 May 1, 2003

Related U.S. Application Data

(63) Continuation of application No. 10/100,065, filed on Mar. 19, 2002, now Pat. No. 6,567,282.

(30) Foreign Application Priority Data

Oct. 25, 2001 (JP) ........................................ 2001-327090

(51) Int. Cl.$^7$ ............................. H02M 5/45; H02P 9/00
(52) U.S. Cl. ........................... 322/17; 322/20; 318/438; 363/37
(58) Field of Search ................................ 318/140, 141, 318/142, 143, 156, 157, 438; 322/10, 11, 17, 20; 363/37

(56) References Cited

U.S. PATENT DOCUMENTS

| 5,384,527 | A | * | 1/1995 | Rozman et al. ................ 322/10 |
| 5,495,163 | A | * | 2/1996 | Rozman et al. ................ 322/10 |
| 5,994,881 | A | * | 11/1999 | Miyazaki et al. .............. 322/16 |
| 6,172,498 | B1 | * | 1/2001 | Schmidt et al. ........ 324/207.12 |
| 6,329,773 | B1 | * | 12/2001 | Xia et al. .................... 318/140 |

FOREIGN PATENT DOCUMENTS

JP 09-191698 7/1997

* cited by examiner

*Primary Examiner*—Bentsu Ro
(74) *Attorney, Agent, or Firm*—Crowell & Moring LLP (57) ABSTRACT

An apparatus for controlling a synchronous generator having a converter. A voltage detector detects a terminal voltage of a stator of the synchronous generator. A current detector detects a current flowing through the stator. A rotor position estimating part estimates a rotor position of the synchronous generator from the detected voltage and current. An active power detector detects a active power of the synchronous generator. A reactive power detector detects a reactive power of the synchronous generator or a terminal voltage detector detects an effective value of a terminal voltage of the stator. An active power controller adjusts a q-axis current command to control the active power, and a reactive power controller or terminal voltage controller adjusts a d-axis current command to control the reactive power or terminal voltage.

5 Claims, 5 Drawing Sheets

POWER GENERATION SYSTEM USING SYNCHRONOUS GENERATOR

This application is a continuation of application Ser. No. 10/100,065, filed Mar. 19, 2002 now U.S. Pat. No. 6,567,282.

BACKGROUND OF THE INVENTION

The present invention relates to apparatuses and methods for controlling a synchronous generator and more particular, to an apparatus and method for controlling a synchronous generator without using a sensor for detecting the position of a rotor in the generator.

In order to drive a synchronous machine, a sensor for detecting the position of a rotor is required in the prior art machine. Meanwhile, there are already proposed several methods of controlling the driving operation of a synchronous machine without using a sensor for detecting the position of a rotor in the machine. Described, for example, in JP-A-9-191698 is a method for estimating a voltage induced in a synchronous machine, estimating a shift angle between the position of a rotor of the machine and an estimated value of the rotor position on the basis of the estimated induced voltage, and correcting the estimated value of the rotor position.

A control system of a converter for driving the synchronous machine generally includes a speed control system and a current control system. The speed control system receives a difference between a detected speed value and a speed command, and generates a current command according to the speed command. The current control system receives a difference between a detected current value and a current command, and generates a voltage command to the converter according to the current command.

However, when a sensor for detecting the position of a rotor is used, a total cost is increased by a cost corresponding to the sensor. Further, since not only the sensor for detection of the rotor position but also wiring signal lines for the sensor are required, this leads to an increase in the entire scale of its machine. Furthermore, when the total length of the signal lines becomes large, the signal lines will tend to easily carry noise and thus a measure to avoid the noise will be required. Even when the sensor for detecting the rotor position is not used, on the other hand, the aforementioned rotor position estimating method in the prior art requires estimation of a shift angle between the rotor position and an estimated value of the rotor position. For this reason, the structure of a rotor position estimating block becomes complicated and thus a calculation time taken for the estimation of the rotor position is also prolonged. In the converter control system in the prior art, a change in a resistive value caused by a change in temperature or the like generates an error. When such an error causes an error in the estimated value of the rotor position, the control accuracy of the converter will drop. This is because the current command is determined by the estimated rotor position, in which case the synchronous machine cannot produce a stable output.

SUMMARY OF THE INVENTION

It is therefore an object of the present invention to drive a synchronous generator through a simple sensorless control with a short calculation time and without using a sensor for detecting the position of a rotor, accurately control a converter independently of an error in the estimated value of the rotor position, and produce a stable output of the generator.

In accordance with the present invention, the above object is attained by providing an apparatus for controlling a synchronous generator which comprises a converter connected to a stator of the synchronous generator and an inverter connected to the converter and also connected to a power system. The converter converts a power of a variable frequency generated by the synchronous generator to a D.C. power, and the inverter converts the D.C. power to an A.C. power of a fixed frequency. The converter includes a voltage detector for detecting a terminal voltage of the stator of the synchronous generator, a current detector for detecting a current flowing through the stator of the synchronous generator, and a rotor position estimating means for estimating a rotor position of the synchronous generator from a voltage detected by the voltage detector and a current detected by the current detector. The rotor position estimating means calculates a d-axis component of a voltage induced in the synchronous generator in a d-q axis coordinate system determined by a rotor position during estimation and controls the d-axis component of the induced voltage to zero to estimate the rotor position. The rotor position estimating means includes an active power detector for detecting a active power of an output of the synchronous generator and a reactive power detector for detecting a reactive power of the output of the synchronous generator or a terminal voltage detector for detecting an effective value of the terminal voltage of the stator of the synchronous generator The rotor position estimating means also includes an active power controller for controlling the active power of the output of the synchronous generator with use of the active power value detected by the active power detector and an active power controller for controlling the reactive power of the output of the synchronous generator or a terminal voltage controller for controlling the terminal voltage of the synchronous generator with use of the terminal voltage value detected by the terminal voltage detector. The active power controller adjusts a q-axis current command on the d-q axis coordinate system determined by the rotor position estimating means to control the active power of the synchronous generator. The reactive power controller or the terminal voltage controller adjusts a d-axis current command on the d-q axis coordinate system determined by the rotor position estimating means to control the reactive power or terminal voltage of the synchronous generator.

Other objects, features and advantages of the invention will become apparent from the following description of the embodiments of the invention taken in conjunction with the accompanying drawings.

DESCRIPTION OF THE EMBODIMENTS

Figure 1:
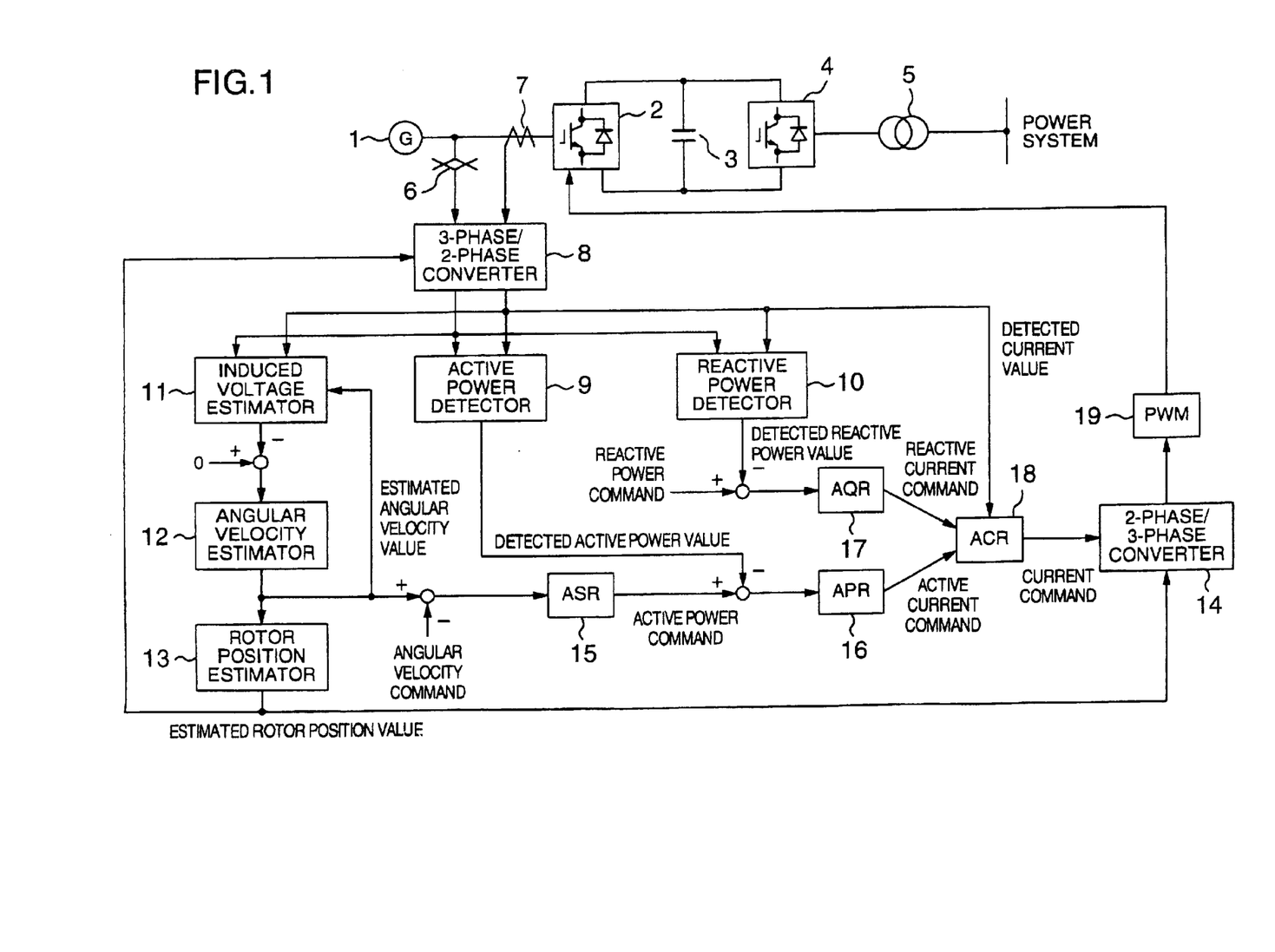
FIG. 1 shows an arrangement of a power generating system to which the present invention is applied.

An embodiment of the present invention will be explained with reference to the accompanying drawings. FIG. 1 shows a general arrangement of an embodiment of the present invention. In FIG. 1, a converter 2 is connected to a stator of a synchronous generator 1 and also D.C. connected to an inverter 4 via a D.C. capacitor 3. The inverter 4 is connected to a power system via a transformer 5 for system interconnection.

A voltage detector 6 and a current detector 7 are provided between the synchronous generator 1 and converter 2, the voltage detector 6 detecting a terminal voltage across the synchronous generator 1, the current detector 7 detecting a current flowing through a stator of the synchronous generator 1. The values of the detected voltage and current are converted to two components of d- and q-axis components by a three-phase/two-phase converter 8.

The active power detector 9 detects a active power as an output of the synchronous generator 1 on the basis of two axis component signals as outputs of the three-phase/two-phase converter 8. A reactive power detector 10 detects a reactive power of the output of the synchronous generator 1 on the basis of the two axis component signals as the outputs of the three-phase/two-phase converter 8.

An induced voltage estimator 11 estimates a voltage induced in the synchronous generator 1 on the basis of the two axis component signals as the outputs of the three-phase/two-phase converter 8 as well as an estimated angular velocity value as the output of an angular velocity estimator 12. The induced voltage of the synchronous generator 1 can be found by correcting a voltage drop caused by the resistive component and synchronous reactance of the synchronous generator 1 from the terminal voltage of the synchronous generator 1. The induced voltage estimator 11 outputs an d-axis component in the estimated induced voltage.

An input of the angular velocity estimator 12 is a difference between the d-axis component of the estimated induced voltage as the output of the induced voltage estimator 11 and zero; while an output of the angular velocity estimator 12 is an estimated angular velocity value. The angular velocity estimator 12 forms a proportional integration control system. An output of the angular velocity estimator 12 is limited by a limiter, the upper and lower limit values of the limiter being determined by an operating speed range of the synchronous generator 1. By providing the limiter, the estimated angular velocity value of the output of the angular velocity estimator 12 can be prevented from being out of the operating speed range.

An input of a rotor position estimator 13 is the estimated angular velocity value as the output of the angular velocity estimator 12, while an output thereof is an estimated rotor position value. The rotor position estimator constitutes an integrator. A two-phase/three-phase converter 14 performs its converting operation on the basis of an estimated rotor position value as the output of the rotor position estimator 13.

Figure 2:
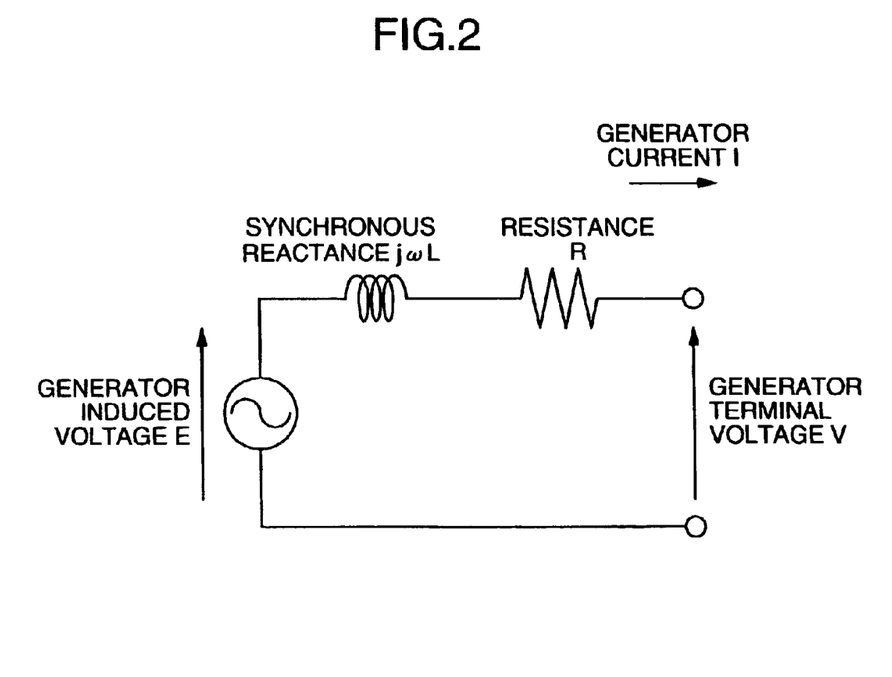
FIG. 2 is an equivalent circuit of a synchronous generator.

Explanation will now be made in detail as to the operations of the induced voltage estimator 11, angular velocity estimator 12 and rotor position estimator 13. For simplicity, explanation will be made in connection with a cylindrical rotor synchronous generator, but this holds true even for a silient pole synchronous generator. Shown in FIG. 2 is an equivalent circuit of the cylindrical rotor synchronous generator. From FIG. 2, Equation (1) which is given below is satisfied, where reference symbol E denotes an induced voltage, V denotes the terminal voltage of the generator, ω denotes an angular velocity, L denotes a synchronous reactance, and I denotes a generator current.

$$E = V + (R + j\omega L) \cdot I \tag{1}$$

Now Equation (1) is developed in a d-q axis coordinate system. Assuming that Ed denotes a d-axis component of the induced voltage E, E-q denotes a q-axis component of the voltage E, Vd denotes a d-axis component of the generator terminal voltage V, Vq denotes a q-axis component of the voltage V, Id denotes a d-axis component of the generator current I, and Iq denotes a q-axis component of the current I; then Equations (2) and (3) are satisfied as follows.

$$Ed = Vd + R \cdot Id - \omega L \cdot Iq \tag{2}$$

$$Eq = Vq + R \cdot Iq + \omega L \cdot Id \tag{3}$$

Figure 3:
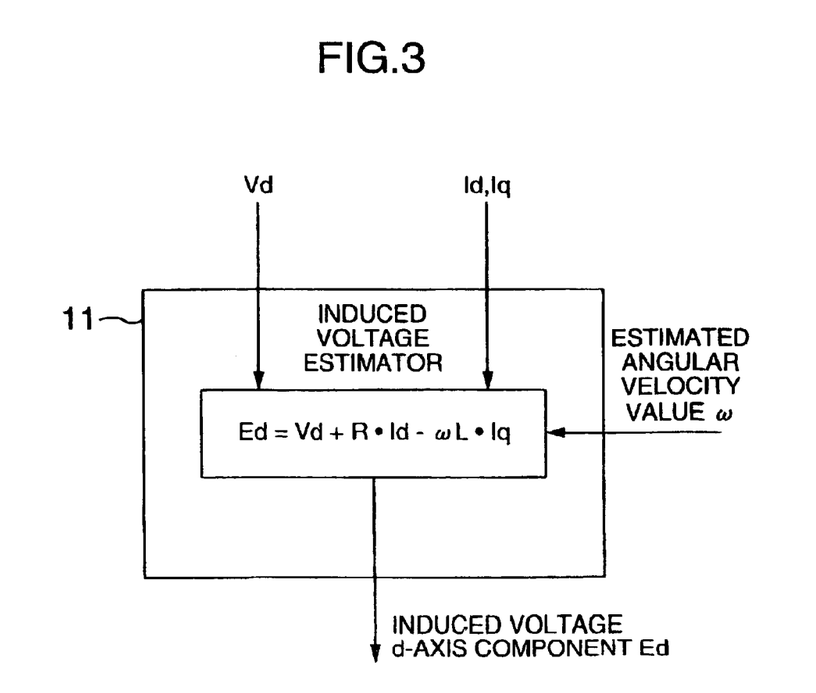
FIG. 3 shows details of an induced voltage estimator.

Since the induced voltage estimator 11 outputs the d-axis component of the induced voltage, it is only required to calculate Ed in Equation (2). FIG. 3 shows details of the induced voltage estimator 11.

Now consider a case of Ed>0. In the case of Ed>0, a vector diagram of the synchronous generator is given in FIG. 4. In this connection, for simplicity of explanation, the resistance of a winding in the synchronous generator is ignored.

Figure 4:
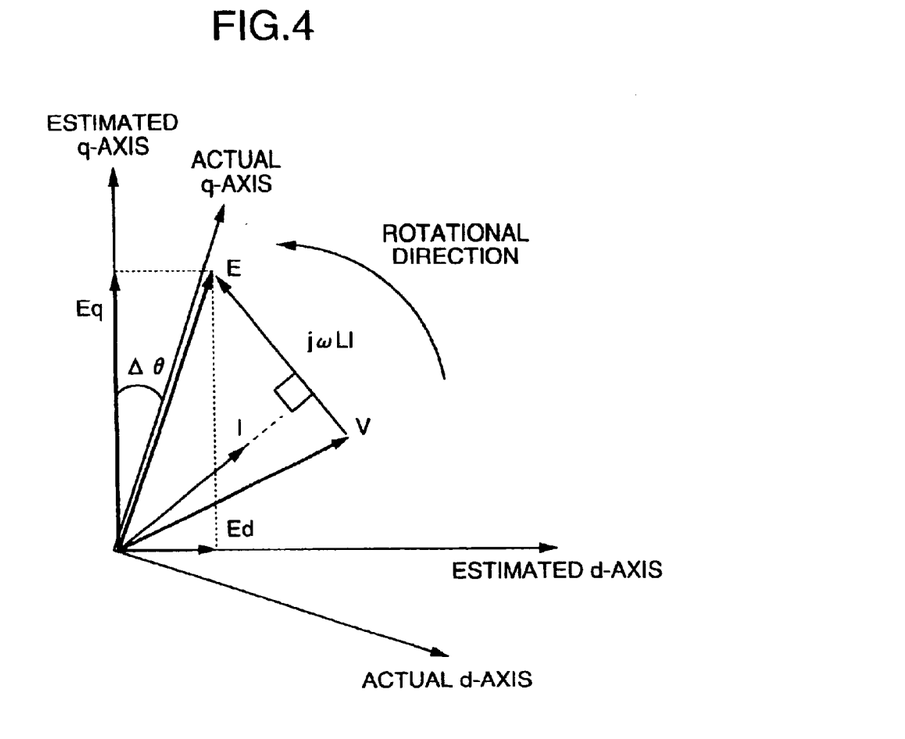
FIG. 4 is a vector diagram (Ed>0) of the synchronous generator.

In this case, as shown in FIG. 4, the estimated value of the rotor position leads an actual rotor position with respect to phase. Due to Ed>0, An input to the angular velocity estimator 12 has a negative value and the angular velocity estimator 12 forms a proportional integration control system, with the result that an estimated angular velocity value as the output of the angular velocity estimator 12 is decreased. Since the rotor position estimator 13 constitutes an integrator, the decrease of the estimated angular velocity value as the input of the estimator 13 causes a drop of an increase rate in the estimated rotor position value as the output of the estimator 13. As a result, a phase difference between the actual d-q axes and estimated d-q axes is decreased to find a phase coincidence therebetween.

Figure 5:
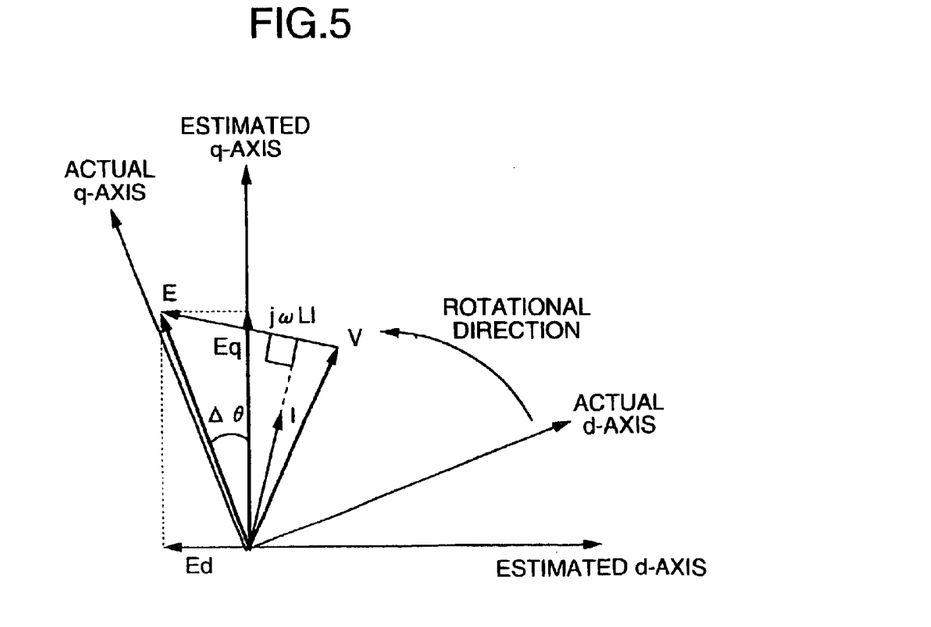
FIG. 5 is a vector diagram (Ed<0) of the synchronous generator.

In a case of Ed<0, conversely, a vector diagram of the synchronous generator is given in FIG. 5, in which case an estimated rotor position value lags an actual rotor position with respect to phase. Due to Ed<0, an input to the angular velocity estimator 12 has a positive value and the angular velocity estimator 12 forms the proportional integration control system, so that an estimated angular velocity value as the output of the estimator 12 increases. Since the rotor position estimator 13 constitutes an integrator, when the estimated angular velocity value increases as the input of the estimator 13, an increase rate in the estimated rotor position value as the output of the estimator 13 is increased. As a result, a phase difference between actual and estimated d-q axes is decreased to find a phase coincidence therebetween.

In this way, by calculating a d-axis component in the induced voltage of the synchronous generator 1 and controlling the d-axis component of the induced voltage to be zero, the rotor position of the synchronous generator 1 can be estimated. In accordance with the present invention, the need for calculating a shift angle in the estimated rotor position value can be eliminated and the rotor position can be estimated with a simple arrangement.

An input to a rotational speed controller 15 is a difference between an estimated angular velocity value as the output of the angular velocity estimator 12 and a angular velocity command, and an output of the controller 15 becomes a active power command. When the rotational speed controller 15 forms, for example, a proportional integration control system and the angular velocity of the synchronous generator 1 is larger than the angular velocity command, the output of the rotational speed controller 15 becomes large and the active power of the output of the synchronous generator 1 becomes also large.

As a result, when the active power of the output of the synchronous generator 1 becomes larger than a mechanical input provided externally to the synchronous generator 1, its input becomes insufficient. However, since the insufficient part of the input is complementarily supplied from rotational energy, the rotational speed of the synchronous generator 1 is decreased and follows the angular velocity command. On the contrary, when the angular velocity of the synchronous generator 1 is smaller than the angular velocity command, the output of the rotational speed controller 15 becomes small and the active power of the output of the synchronous generator 1 becomes small. For this reason, when the active power of the output of the synchronous generator 1 becomes smaller than a mechanical input provided externally to the synchronous generator 1, the input becomes excessive. However, since the excessive-input part is stored as the rotary energy of the synchronous generator 1, the rotational speed of the synchronous generator 1 is increased to follow the angular velocity command.

An input to a active power controller 16 is a difference between the active power command of the output of the rotational speed controller 15 and the active power value detected by the active power detector 9, while an output of the controller 16 is a active part of the current command to the converter 2. An input to a reactive power controller 17 is a difference between a reactive power command provided externally and the detected reactive power value as the output of the reactive power detector 10, while an output of the controller 17 is a reactive part of the current command to the converter 2. The active power controller 16 and reactive power controller 17 both form, e.g., a proportional integration control system, and the current command to the converter 2 is determined so that the difference between the active power command and detected active power value as well as the difference between the reactive power command and detected reactive power value become both zero.

Inputs to a current controller 18 are a detected current value of the two axis components as the outputs of the three-phase/two-phase converter 8, a active part of the current command of the output of the active power controller 16 to be sent to the converter 2, and a reactive part of the current command of the output of the reactive power controller 17 to be sent to the converter 2; while an output of the controller 18 is an output voltage command to the converter 2. The current controller 18 forms, e.g., a proportional integration control system, and the output voltage command to the converter 2 is determined so that a difference between the detected current value and current command becomes zero. Since the output voltage command of the output of the current controller 18 to the converter 2 is of two axis components, the output voltage command is converted by the two-phase/three-phase converter 14 to a three-phase voltage command.

A pulse generator 19 outputs a gate pulse signal to the converter 2 in a pulse width modulation (PWM) scheme on the basis of a three-phase output voltage command of an output of the two-phase/three-phase converter 14 to be sent to the converter 2. The converter 2 receives the gate pulse signal, a semiconductor switching element such as an insulated gate bipolar transistor (IGBT) performs its switching operation at a high speed, and the converter 2 outputs a voltage corresponding to a command.

With such an arrangement of the control system as mentioned above, the rotational speed of the synchronous generator 1 and the active and reactive powers of the output of the synchronous generator 1 can be controlled. When the active power of the output of the synchronous generator 1 is controlled, the generator can produce a stable output.

On the other hand, when a estimated rotor position value has an error, it becomes generally difficult to accurately control a converter. This is because a current command to the converter is determined in a d-q axis coordinate system determined by the estimated rotor position value. However, when the active power controller 16 and reactive power controller 17 are built in as in the present invention, the converter can be accurately controlled even when the estimated rotor position value has an error. Explanation will be made as to the operation of the control system of the present invention when the estimated rotor position value has an error.

The active power detector 9 and reactive power detector 10 solve Equations (4) and (5), where P and Q denote detected active and reactive power values in the output of the synchronous generator 1, Vd and Vq denote d- and q-axis components of the terminal voltage of the synchronous generator 1, and Id and Iq denote d- and q-axis components of a current flowing through the stator of the synchronous generator 1 respectively.

$$P = 3/2 \cdot (Vd \cdot Id + Vq \cdot Iq) \tag{4}$$

$$Q = 3/2 \cdot (Vq \cdot Id - Vq \cdot Iq) \tag{5}$$

The three-phase/two-phase converter 8 solves Equations (6) and (13) which are given in the following. In the Equations, θ denotes an estimated rotor position value of the output of the rotor position estimator 13, VU, VV and VW denote three phase components of the terminal voltage of the synchronous generator 1, IU, IV and IW denote three phase components of a current flowing through the stator of the synchronous generator 1, Vα and Vβ denote α- and β-axis components of the terminal voltage of the synchronous generator 1, and Iα and Iβ denote α- and β-axis components of a current flowing through the stator of the synchronous generator 1, respectively. An α-β axis coordinate system is a coordinate system of two axes fixed to the stator of the synchronous generator 1. The three-phase/two-phase converter 8 calculates to convert three phase detected values to values in the α-β axis coordinate system with use of Equations (6) to (9) and further to convert them to values in the d-q axis coordinate system with use of Equations (10) to (13).

$$V\alpha = 2/3 \cdot (VU - VV/2 - VW/2) \tag{6}$$

$$V\beta = 2/3 \cdot (\sqrt{3}/2 \cdot VV - \sqrt{3}/2 \cdot VW) \tag{7}$$

$$I\alpha = 2/3 \cdot (IU - IV/2 - IW/2) \tag{8}$$

$$I\beta = 2/3 \cdot (\sqrt{3}/2 \cdot IV - \sqrt{3}/2 \cdot IW) \tag{9}$$

$$Vd = \cos\theta \cdot V\alpha + \sin\theta \cdot V\beta \tag{10}$$

$$Vq = -\sin\theta \cdot V\alpha + \cos\theta \cdot V\beta \tag{11}$$

$$Id = \cos\theta \cdot I\alpha + \sin\theta \cdot I\beta \tag{12}$$

$$Iq = \sin\theta \cdot I\alpha + \cos\theta \cdot I\beta \tag{13}$$

When Equation (13) is substituted into Equations (4) and (5) with use of Equation (10), Equations (14) and (15) which follow are satisfied $$P = 3/2 \cdot (V\alpha \cdot I\alpha + V\beta \cdot I\beta) \tag{14}$$

$$Q = 3/2 \cdot (V\beta \cdot I\alpha - V\alpha \cdot I\beta) \tag{15}$$

It will be seen from Equations (14) and (15) that P and Q can be found from Vα and Vβ and from Iα and Iβ. Since Vα and Vβ and Iα and Iβ are independent of θ from Equation (6) and from Equation (9), further, it will be seen that P and Q are independent of θ. It will be appreciated from the above that, even when the estimated rotor position value contains an error, the active and reactive power detectors 9 and 10 can correctly detect active and reactive powers of the output of the synchronous generator 1. When the active and reactive powers of the output of the synchronous generator 1 are correctly detected, the active and reactive power controllers 16 and 17 can control the active and reactive powers to approach their commands. Thus even when the estimated rotor position value contains an error, the active and reactive power controllers 16 and 17 determine the current command in such a manner as to correct the error. Thus even when the estimated rotor position value contains an error, the converter 2 can be accurately controlled.

Figure 6:
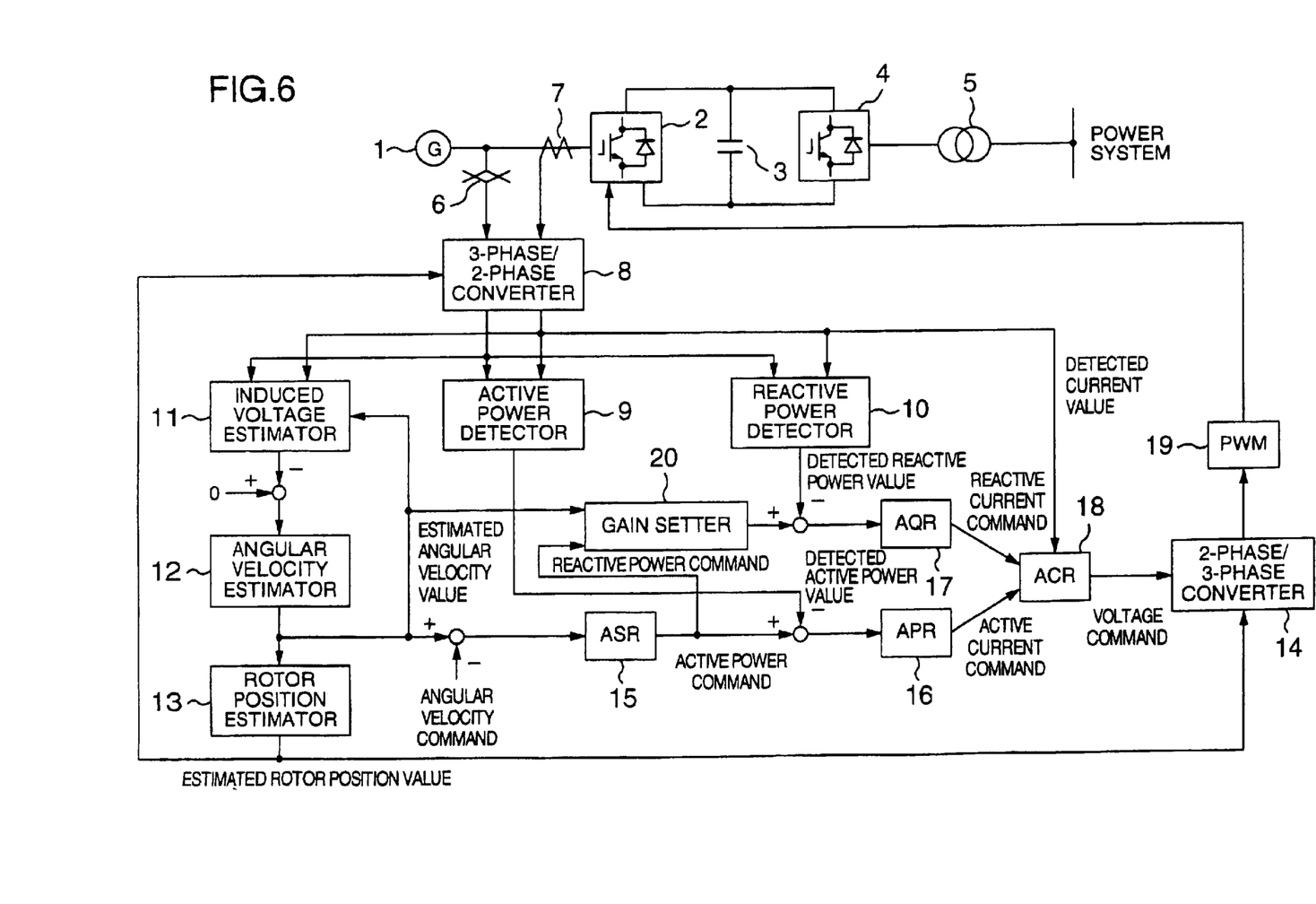
FIG. 6 is an arrangement of the power generating system to which the present invention is applied for control of power factor.

Next an embodiment when the power factor of the synchronous generator 1 is controlled is shown in FIG. 6. When the reactive power of the output of the synchronous generator 1 is controlled, the power factor of the synchronous generator 1 can be controlled. Since the power factor of the synchronous generator 1 can be controlled by adjusting a ratio between the active and reactive powers of the output of the synchronous generator 1, its reactive power command can be given by multiplying its active power command by a gain.

Inputs to a gain setter 20 are the active power command as the output of the rotational speed controller 15 and the estimated angular velocity value as the output of the angular velocity estimator 12; while an output of the gain setter 20 is the reactive power command to the converter 2. The gain setter 20 adjusts the gain to be multiplied by the active power command according to the estimated angular velocity value and outputs the value of multiplication between the adjusted gain and active power command as the reactive power command.

When the estimated angular velocity value is low, the gain setter 20 adjusts the gain in such a manner that the induced voltage and current of the synchronous generator 1 coincides with each other in their phase. In this way, such gain adjustment enables operation of the synchronous generator 1 with a high efficiency and with a small generator current in a low rotational speed range of the generator 1.

When the estimated angular velocity value is high, on the other hand, since the induced voltage of the synchronous generator 1 becomes high, the terminal voltage of the synchronous generator 1 also becomes generally high. When the terminal voltage of the synchronous generator 1 becomes high, there may sometimes occur such a situation that the generator cannot be operated due to an overvoltage. To avoid this, when the estimated angular velocity value is high, the gain setter 20 adjusts the gain in such a manner that the current of the synchronous generator 1 lags the induced voltage of the synchronous generator with respect to phase. When the gain is adjusted in this way, the terminal voltage of the synchronous generator 1 can be made low and the synchronous generator 1 can be operated in a high rotational speed range of the generator 1 with an increase in the terminal voltage of the generator 1 being suppressed.

As mentioned above, by controlling the power factor of the synchronous generator 1, the synchronous generator 1 can be operated with a high efficiency and the increase of the terminal voltage of the generator 1 can be suppressed.

Figure 7:
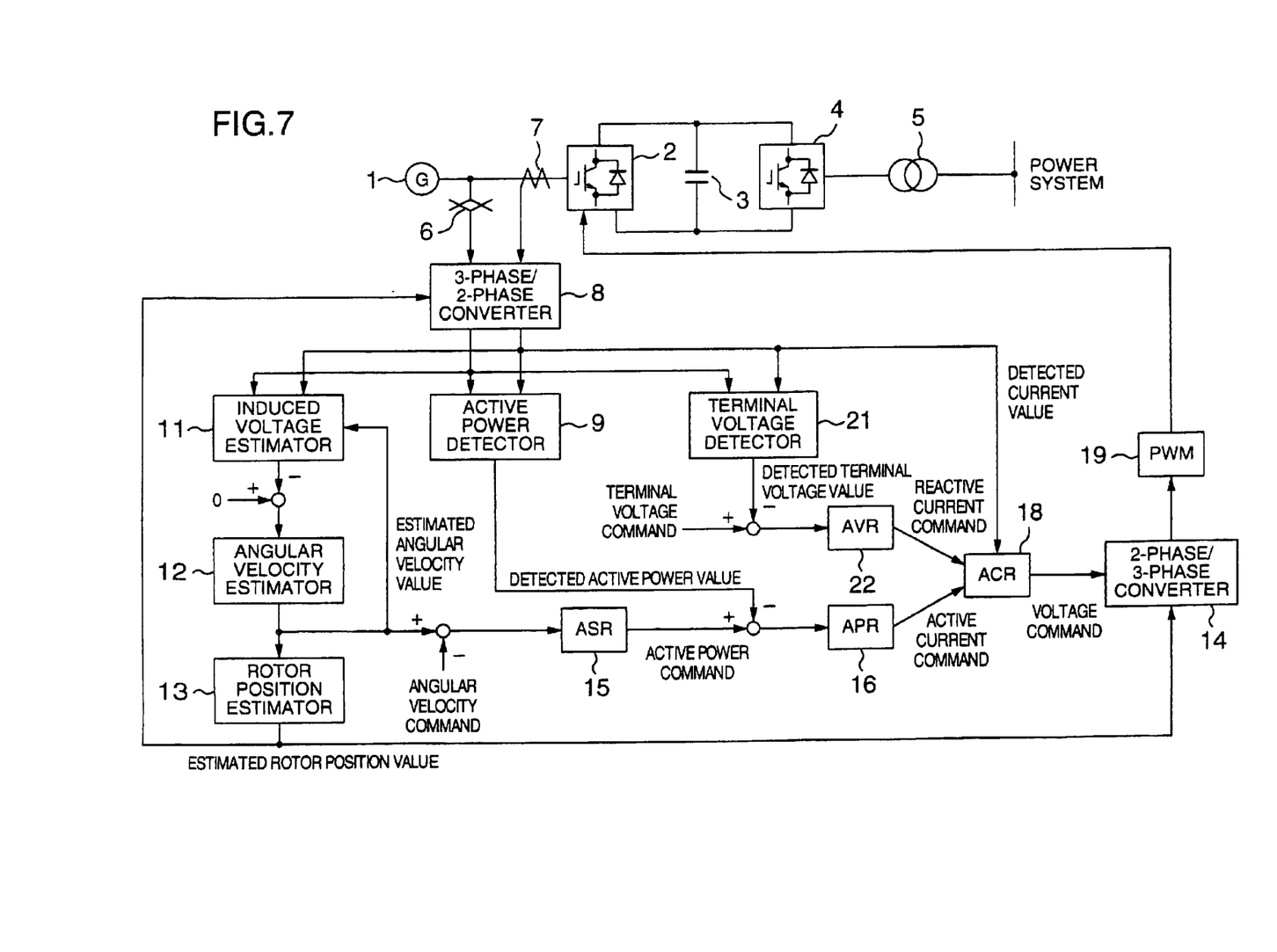
FIG. 7 is an arrangement of the power generating system to which the present invention is applied, for control of terminal voltage.

Further, the terminal voltage of the synchronous generator 1 can be directly controlled. An embodiment when the terminal voltage of the synchronous generator 1 is controlled is shown in FIG. 7. The embodiment of FIG. 7 is basically the same arrangement as that of the embodiment of FIG. 1, except that the reactive power detector 10 in FIG. 1 is connected to a terminal voltage detector 21 and the reactive power controller 17 is changed to a terminal voltage controller 22.

The terminal voltage detector 21 detects the effective value of the terminal voltage of the synchronous generator 1 on the basis of two axis component signals as the outputs of the three-phase/two-phase converter 8. An input to the terminal voltage controller 22 is a difference between a terminal voltage command provided externally and a detected terminal voltage value as the output of the terminal voltage detector 21, while the output of the terminal voltage controller 22 is a reactive part of the current command to the converter 2. The terminal voltage controller 22, which forms, e.g., a proportional integration control system, determines a reactive part of the current command to the converter 2 in such a manner that the difference between the terminal voltage command and detected terminal voltage value becomes zero. Adjustment of the reactive part of the current command to the converter 2 enables adjustment of the power factor of the synchronous generator 1 and enables control of the terminal voltage of the synchronous generator 1.

The terminal voltage detector 21 performs its calculation in accordance with Equation 16, where Vt denotes a detected value of the terminal voltage of the synchronous generator 1, and Vd and Vq denote d- and q-axis components of the terminal voltage of the generator 1 respectively.

$$Vt=\sqrt{(3/2)}\cdot\sqrt{(Vd\cdot Vd+Vq\cdot Vq)} \tag{16}$$

Substituting Equations (10) and (11) into Equation (16) satisfies Equation (17).

$$Vt=\sqrt{(3/2)}\cdot\sqrt{(V\alpha\cdot V\alpha+V\beta\cdot V\beta)} \tag{17}$$

It will be seen from Equation (17) that Vt is found from Vα and Vβ. It will also be seen from Equations (6) and (7) that, since there is Vα and Vβ are not dependent on θ, Vt is not dependent on θ. From the above, it will be appreciated that, even when the estimated rotor position value contains an error, the terminal voltage detector 21 can correctly detect the effective value of the terminal voltage of the synchronous generator 1. When the detector 21 can correctly the effective value of the terminal voltage of the synchronous generator 1, the terminal voltage controller 22 can control the terminal voltage to approach its command. Thus even when the estimated rotor position value contains an error, the terminal voltage controller determines the reactive part of the current command in such a manner as to correct the error amount. For this reason, even when the estimated rotor position value contains an error, the converter 2 can be accurately controlled.

The apparatus can be made small in size without using a rotor position detecting sensor by driving the synchronous generator under the simple sensorless control. Further, the converter can be accurately controlled independently of an error included in the estimated rotor position value. Furthermore, the generator can produce a stable output by controlling the active power. In addition, the synchronous generator can be operated with a high efficiency or the terminal voltage of the synchronous generator can be controlled by controlling the reactive power.

It should be further understood by those skilled in the art that the foregoing description has been made on embodiments of the invention and that various changes and modifications may be made in the invention without departing from the spirit of the invention and the scope of the appended claims.

What is claimed is:

1. A power generation system using a synchronous generator, a converter connected to a stator of said synchronous generator, a capacitor connected to an output side of said converter, and an inverter connected to said capacitor, wherein said inverter is connected to a power system via a transformer, and said converter includes a voltage detector for detecting a terminal voltage of the stator of said synchronous generator, a current detector for detecting a current flowing through the stator of said synchronous generator, and rotor position estimating means for estimating a rotor position of said synchronous generator from a voltage detected by said voltage detector and a current detected by said current detector, and wherein said rotor position estimating means calculates a d-axis component of a voltage induced in said synchronous generator in a d-q axis coordinate system determined by a rotor position during estimation and controls the d-axis component of said induced voltage to zero to estimate the rotor position, said rotor position estimating means includes an active power detector for detecting an active power of an output of said synchronous generator and a reactive power detector for detecting a reactive power of the output of said synchronous generator or a terminal voltage detector for detecting an effective value of the terminal voltage of the stator of said synchronous generator, said rotor position estimating means also includes a reactive power controller for controlling the active power of the output of said synchronous generator with use of the active power value detected by said active power detector and an active power controller for controlling the reactive power of the output of said synchronous generator or a terminal voltage controller for controlling the terminal voltage of said synchronous generator with use of the terminal voltage value detected by said terminal voltage detector, said active power controller adjusts a q-axis current command on the d-q axis coordinate system determined by said rotor position estimating means to control the active power of said synchronous generator, said reactive power controller or said terminal voltage controller adjusts a d-axis current command on the d-q axis coordinate system determined by said rotor position estimating means to control the reactive power or terminal voltage of said synchronous generator.

2. A power generation system using a synchronous generator as set forth in claim 1, wherein said converter includes an Insulated Gate Bipolar Transistor as a switching device, and said Insulated Gate Bipolar Transistor is driven in a pulse width modulation scheme.

3. A power generation system using a synchronous generator as set forth in claim 1, wherein said synchronous generator generates three-phase alternating current.

4. A power generation system using a synchronous generator as set forth in claim 1, wherein said synchronous generator is a cylindrical rotor synchronous generator.

5. A power generation system using a synchronous generator as set forth in claim 1, wherein said synchronous generator is a salient pole synchronous generator.

* * * * *